United States Patent
Molenaar et al.

(10) Patent No.: US 6,907,361 B2
(45) Date of Patent: Jun. 14, 2005

(54) ULTRASONIC FLOW-MEASURING METHOD

(75) Inventors: Marcel Meijlom Molenaar, Dordrecht (NL); Eugene Albert van Dijk, Spijkenisse (NL)

(73) Assignee: Khrone A.G., Basel (CH)

( * ) Notice: Subject to any disclaimer, the term of this patent is extended or adjusted under 35 U.S.C. 154(b) by 0 days.

(21) Appl. No.: 10/464,182

(22) Filed: Jun. 18, 2003

(65) Prior Publication Data

US 2004/0176917 A1 Sep. 9, 2004

(30) Foreign Application Priority Data

Mar. 6, 2003 (DE) .......................................... 103 10 041
Mar. 18, 2003 (DE) .......................................... 103 12 034

(51) Int. Cl.[7] ................................................ G01F 1/00
(52) U.S. Cl. ............................. 702/48; 702/45; 702/33; 73/861.18; 73/861.25; 73/861.27; 73/761.28; 73/861.29; 73/861.31
(58) Field of Search ............................... 702/48, 45, 33; 73/861.18, 861.25, 861.26, 861.27, 861.28, 861.29, 861.31

(56) References Cited

U.S. PATENT DOCUMENTS

| | | | |
|---|---|---|---|
| 4,930,358 A | | 6/1990 | Motegi et al. |
| 5,117,698 A | * | 6/1992 | Baumoel ................. 73/861.28 |
| 5,280,728 A | | 1/1994 | Sato et al. |
| 5,329,821 A | * | 7/1994 | Birnbaum et al. ....... 73/861.28 |
| 5,531,124 A | * | 7/1996 | Kim et al. ................ 73/861.27 |
| 5,546,813 A | * | 8/1996 | Hastings et al. ......... 73/861.29 |
| 5,824,914 A | | 10/1998 | Seppa et al. |
| 6,158,288 A | * | 12/2000 | Smith ....................... 73/861.25 |
| 6,381,549 B1 | * | 4/2002 | Smith .......................... 702/54 |

FOREIGN PATENT DOCUMENTS

| | | |
|---|---|---|
| DE | 33 31 519 C2 | 3/1985 |
| DE | 38 09 189 C2 | 12/1992 |
| DE | 44 22 367 C1 | 2/1996 |
| DE | 100 57 342 A1 | 5/2002 |
| WO | WO 9814774 A1 * 4/1998 | .......... G01N/29/02 |

* cited by examiner

*Primary Examiner*—John Barlow
*Assistant Examiner*—Anthony Dougherty
(74) *Attorney, Agent, or Firm*—Cesari and McKenna LLP; John F. McKenna

(57) ABSTRACT

An ultrasonic flow-measuring method determines the flow rate of a medium flowing through a line is determined by measuring the runtime of an ultrasonic signal that travels from a first ultrasonic transducer to at least one other ultrasonic transducer. The runtime of the ultrasonic signal as it makes m passes in immediate succession through a predefined path over a predefined path length and at a predefined angle relative to the flow direction is measured, and the runtime of the ultrasonic signal as it makes n passes in immediate succession through the predefined path over the predefined path length at the predefined angle relative to the flow direction is measured, with m and n being mutually different integers, and the dead time of the ultrasonic flow-measuring process is determined on the basis of the measured runtimes. This ultrasonic flow-measuring method permits real-time compensation for the dead time during the actual measuring process, the result being highly accurate measurements.

10 Claims, 2 Drawing Sheets

ULTRASONIC FLOW-MEASURING METHOD

This invention relates to an ultrasonic flow-measuring method whereby the flow rate of a medium flowing through a line is determined by measuring the runtime of an ultrasound signal traveling from a first ultrasound transducer to at least one other ultrasound transducer.

BACKGROUND OF THE INVENTION

1. Field of the Invention

Ultrasonic flow-measuring processes have been implemented with the aid of ultrasonic flowmeters ranging in design from built-in versions all the way to flexible clamp-on systems (clamp-on ultrasonic flowmeters). Ultrasonic flowmeters are available for lines with diameters from a few millimeters to several meters and are typically employed for measuring the volumetric flow rate of low-viscosity mediums.

The measuring concept in an ultrasonic flow-measuring process is based either on the entrainment effect or on the Doppler effect. The entrainment effect derives from the fact that the runtime of an ultrasound signal traveling through a flowing medium between two ultrasonic transducers is either longer or shorter depending on whether the directional component through the measuring path runs with or against the direction of flow of the medium. What is measured here is the mean flow rate through the measuring-path section of the line traversed by the ultrasonic signal. The Doppler effect utilizes sound-scattering particles contained in the medium, with the flow rate of the medium being measured across the volumetric profile of two ultrasonic paths.

The advantages offered by ultrasonic flowmeters essentially consist in the fact that no moving parts need to be provided within the line, that there is no cross-sectional narrowing or contraction of the line, that the method applied is essentially independent of the electrical conductivity and the viscosity of the flowing medium, that the available measuring range is quite broad, that there is virtually no pressure loss, and that in the case of a clamp-on design the line does not have to be opened. On the other hand, precise and reproducible ultrasonic flow-rate measurements require unimpeded linear inlet and outlet sections for obtaining a stable flow profile. Moreover, the flow rates determined in an ultrasonic flow-measuring process usually do not represent rates that are averaged across the full diameter of the line, thus necessitating corresponding corrections for a calculation of the volumetric or mass flow.

Ultrasonic flow measuring techniques employing the aforementioned entrainment effect are based on the measurement of the runtime of an ultrasound signal traveling between two ultrasonic transducers mutually offset in the direction of the flow. The run-time determined by the ultrasonic flowmeter in the ultrasonic flow-measuring process is composed of the runtime of the ultrasonic signal through the flowing medium, the run-time of the ultrasonic signal within the ultrasonic transducers and delay times in the measuring electronics of the ultrasonic flowmeter. The components of the total runtime that differ from the runtime of the ultrasonic signal through the flowing medium, i.e. total runtime minus the runtime through the flowing medium, constitute the time lag or so-called dead time of the ultrasonic flow-measuring process, i.e. of the ultrasonic flowmeter. Obtaining precise measuring results requires appropriate corrections for that dead time.

2. Description of the Prior Art

In conventional ultrasonic flow-measuring processes and ultrasonic flowmeters it has been common practice to perform a one-time calculation of the dead time for the ultrasonic transducers employed, or even for a specific transducer type only, relying in actual measuring operations on the correction made for that dead time on the assumption that the latter would remain constant rather than being subject to changes. In practice, however, it has been found that the measurements obtained have in part been rather error-prone since during the measuring operation the dead time does not remain constant at all but tends to change. This is because the dead time is affected by changes in the ultrasonic field, by the temperature-related properties of the ultrasonic transducers and by fluctuations in the measuring electronics which, as well, are essentially temperature-related. The ultrasonic field, in turn, depends on the configuration of the ultrasonic transducers, the inter-transducer distance and the acoustic characteristics of the flowing medium.

To avoid and at least partly compensate for the dead-time problem that is largely a function of thermal effects, various approaches have been proposed. For example, it has been suggested to arrive at a dead-time correction by determining certain parameters of the measuring electronics or by directly measuring the runtime within the ultrasonic transducers, as described for instance in U.S. Pat. Nos. 5,280,728 and 5,824,914. However, these approaches do not make it possible to factor-in the effects that cause dead-time variations or that originate in the flowing medium itself, so that in the final analysis dead-time correction remains inadequate.

SUMMARY OF THE INVENTION

It is therefore the objective of this present invention to introduce an ultrasonic flow-measuring method that ensures a very precise determination of the dead time, which, in turn, permits an exact-as-possible determination of the flow rate.

In reference to the ultrasonic flow-measuring method described above, the inventive ultrasonic flow-measuring method is characterized by measuring the runtime of the ultrasonic signal that travels in an immediate succession of m passes through a predefined length of the flowing medium over a predefined distance and at a predefined angle relative to the flow direction, and measuring the runtime of the ultrasonic signal that travels in an immediate succession of n passes through said predefined length of the flowing medium over said predefined distance and at said predefined angle relative to the flow direction, with m and n being mutually different integers, whereupon the dead time of the ultrasonic flow-measuring process is determined from the two runtimes so measured.

The above statement regarding the measurement of the runtime of the ultrasonic signal in multiple immediately consecutive passes through a predefined length over a predefined distance at a predefined angle relative to the flow direction is intended to connote that the ultrasonic signal always travels along an identical path in terms of its length and its angle relative to the direction of flow. That may always be exactly the same path created for instance by a multiple reflection of the ultrasonic signal between two ultrasonic transducers. However, an identical path may also be traversed in a way whereby the signal passes through consecutive path segments in the flow direction between a minimum of three ultrasonic transducers. If the flow profile around the main axis of flow is rotationally symmetrical, any path segments may be considered identical if they are of the same length and, otherwise independent in terms of spatial orientation, extend at an identical angle relative to the main axis of flow. The angle relative to the main axis of flow is the acute angle included between the path and the main axis of flow, which means that in determining that angle, the direction of travel through the path segment concerned is of no consequence.

Since the signal travels along the same path m-times and n-times, respectively, the invention provides at least two mutually different runtimes composed, on the one hand, of the dead time of the ultrasonic flow-measuring process and, on the other hand, of the time needed to pass m-times and, respectively, n-times through the predefined path length in the flowing medium. The result is a system of two equations, one for m passes and one for n passes through the same path, with two unknown factors, these being the dead time and the time the signal takes to pass through the flowing medium, but without the time in the ultrasonic transducers or delay times in the measuring electronics. Standard mathematics can be applied to solve these equations.

Of course, the invention also covers ultrasonic flow-measuring processes where in addition to the m and n passes through a predefined path, the signal makes at least an additional number of z-passes through the same path, where z is again an integer and is different from m and n. The corresponding equation problem can again be solved by standard mathematical methodology, although a finite solution may no longer be possible and the answer may have to be arrived at by an approximation method.

If the predefined path is traversed first m-times and then n-times, a preferred embodiment of this invention provides for the dead time $t_d$ to be determined along the following formula:

$$t_d = \frac{t_m \cdot n - t_n \cdot m}{n - m},$$

where $t_m$ is the runtime of the ultrasonic signal in an immediate succession of m passes through the predefined path of the predefined length at the predefined angle relative to the flow direction and $t_n$ is the runtime of the ultrasonic signal in an immediate succession of n passes through the predefined path of the predefined length at the predefined angle relative to the flow direction. This formula can be universally applied as long as the predefined path segments are always traversed in the same direction relative to the flow, i.e. always with a component in or against the direction of flow or perpendicular to the direction of flow. If this formula is to be applied in cases where the ultrasonic signal goes through multiple reflections between two ultrasonic transducers mutually offset in the flow direction, it will be necessary for m and n to be even-numbered values, meaning that the predefined path must always be traversed an integral number of times with a component in the flow direction and with a component against the flow direction. For a multiple reflection of the ultrasonic signal between two ultrasonic transducers mutually offset in the flow direction, the ultrasonic transducers face each other in such fashion that their transmitting and receiving surfaces extend along mutually parallel planes.

As indicated above, a preferred embodiment of the invention provides for the measurement of the respective runtimes of the ultrasonic signal as it traverses the predefined path over a predefined length and at the predefined angle relative to the flowdirection m times, n times, . . . z times in immediately consecutive passes, with m, n, . . . z being mutually different integers. In a preferred implementation of the invention, the dead time $t_d$ of the ultrasonic flow-measuring process is calculated using the following formula:

$$\begin{bmatrix} 1 & m \\ 1 & n \\ \vdots & \vdots \\ 1 & z \end{bmatrix} \cdot \begin{bmatrix} t_d \\ t_s \end{bmatrix} = \begin{bmatrix} t_m \\ t_n \\ \vdots \\ t_z \end{bmatrix}$$

where $t_s$ is the runtime only of the passage through the path lengths in the flowing medium, meaning the total runtime measured minus the dead time, with the solution being provided on the basis of a method of approximation such as the least squares method.

With regard to the positioning of the ultrasonic transducers there are many configurational possibilities. In a preferred invention embodiment, the ultrasonic signal is reflected several times between two ultrasonic transducers that may be offset relative to each other in the direction of flow. It is also possible, however, to position the ultrasonic transducers without offsetting them relative to each other, with the ultrasonic signal traveling perpendicular to the direction of flow.

In an alternative, preferred embodiment of the invention, at least three ultrasonic transducers are so spaced and offset relative to one another that the ultrasonic signal is transmitted from a first transducer along the predefined path with a predefined length and at a predefined angle relative to the flow direction and is received by a second transducer, the ultrasonic signal is partly reflected off the line in the area of the second transducer and then travels along the predefined path with the predefined length and at the predefined angle relative to the flow direction to the third ultrasonic transducer, and the runtime of the ultrasonic signal from the first transducer to the second transducer and the runtime of the ultrasonic signal from the first transducer to the third transducer are measured and the dead time of the ultrasonic flow-measuring process is calculated based on the difference between twice the runtime of the ultrasonic signal from the first transducer to the second transducer and the single runtime of the ultrasonic signal from the first transducer to the third transducer. This preferred embodiment of the invention allows for a very efficient configuration of the ultrasonic transducers that can also be easily implemented especially in a clamp-on ultrasonic flowmeter.

With regard to a correction of the flow rate determined by the ultrasonic flow-measuring method according to the invention, compensation for the dead time is generally accomplished by subtracting it from the total measured runtime of the ultrasonic signal from one transducer to the other, leaving for the flow rate only the time actually taken by the ultrasonic signal to pass through the flowing medium. The dead time of the ultrasonic flow-measuring process can, in fact, be determined at the beginning of the process and/or at different times during the process. A correspondingly determined dead time for instance for a predefined duration can then be used as the dead time in making the correction.

In a preferred implementation of the invention, however, the dead time of the ultrasonic flow-measuring process is determined in a real-time operation and is preferably applied in the determination of the flow rate of the flowing medium, again, in real time. An appropriate real-time operation is made possible by virtue of the simple applicability of the method according to this invention, with the real-time compensation for the dead time resulting in an optimal correction of the measured flow rate and thus in the most precise measuring results.

There are numerous ways in which the ultrasonic flow-measuring method according to the invention can be configured and further enhanced. In this context, attention is invited to the dependent claims and to the following description and drawings.

DESCRIPTION OF A PREFERED EMBODIMENT

Figure 1:
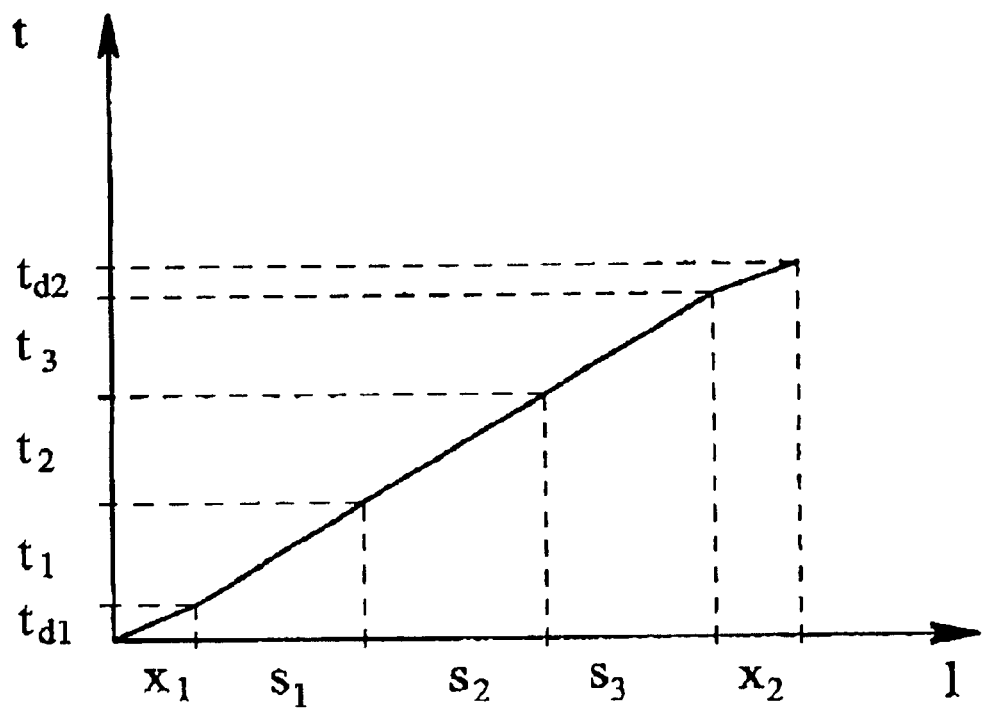
FIG. 1 is a diagrammatic illustration of the composition of the overall runtime as measured for an ultrasonic signal traveling through the flowing medium from a first ultrasonic transducer to a second ultrasonic transducer.

Plotted in FIG. 1 is the time t taken by the ultrasonic signal to pass through a given path as a function of the respective path length l. $x_1$ and $x_2$ indicate the propagation path lengths in the two ultrasonic transducers between which the ultrasonic signal travels through the flowing medium, with $t_{d1}$ and $t_{d2}$ representing the corresponding runtimes including the delay in the measuring electronics. The sum of these two times $t_{d1}$ and $t_{d2}$ equals the dead time $t_d$.

Figure 2:
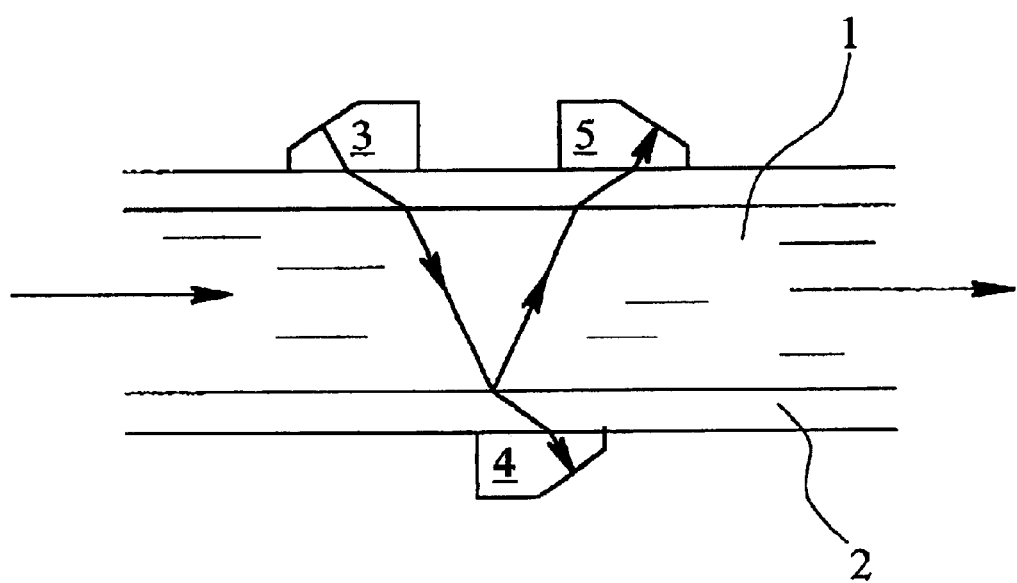
FIG. 2 is a schematic illustration of a clamp-on ultrasonic flowmeter applying an ultrasonic flow-measuring method according to one of the preferred embodiments of this invention.

In addition, $s_1$, $s_2$ and $s_3$ represent immediately consecutive, identical path segments with a predefined length and a predefined angle relative to the direction of flow. Corresponding identical path segments may extend as illustrated in FIG. 2 which figure shows only two consecutive segments. The runtimes of the ultrasonic signal for these path segments are identified by $t_1$, $t_2$ and $t_3$.

To determine the combined dead times of the ultrasonic flow-measuring process, a preferred embodiment of the invention employs for that ultrasonic flow-measuring process a clamp-on ultrasonic flowmeter as indicated in FIG. 2. For simplicity's sake, that figure shows only the ultrasonic transducers 3, 4 and 5 mounted on a line 2 through which the medium 1 flows in the direction of the arrows. The ultrasonic transducers 3, 4 and 5 are positionally offset relative to one another in the flow direction of the medium 1 in such fashion that the run length of an ultrasonic signal traveling from the ultrasonic transducer 3 to the ultrasonic transducer 4 in terms of distance and angle relative to the flow direction of the flowing medium 1 matches the run length between the transducer 4 and the transducer 5.

In the ultrasonic flow-measuring process according to the preferred embodiment of the invention, a measuring electronics unit, not illustrated, measures the runtimes of an ultrasonic signal from the first ultrasonic transducer 3 to the second ultrasonic transducer 4 and from the first ultrasonic transducer 3 to the third ultrasonic transducer 5, the latter case involving a partial reflection off the inner surface of the line near the transducer 4, of the ultrasonic signal emanating from the transducer 3 toward the transducer 5. The dead time of the clamp-on ultrasonic flowmeter employed for the ultrasonic flow-measuring process according to the preferred embodiment of the invention is now determined by establishing the difference between twice the runtime of the ultrasonic signal from the first transducer 3 to the second transducer 4 and the single runtime of the ultrasonic signal from the first transducer 3 to the third transducer 5.

This dead-time determination is continuously performed throughout the ultrasonic flow-measuring process, allowing the dead time determined in real-time to be used, again in real time, for correcting the flow-rate values measured by means of the clamp-on ultrasonic flowmeter.

What is claimed is:

1. An ultrasonic flow-measuring method, whereby the flow rate of a flowing medium through a line is determined by measuring the runtime of an ultrasonic signal that travels from a first ultrasonic transducer to at least one other ultrasonic transducer, comprising the steps of measuring the runtime of the ultrasonic signal as it traverses m-times in immediately consecutive passes a predefined path in the flowing medium over a predefined path length and at a predefined angle relative to the direction of flow;

measuring the runtime of the ultrasonic signal as it traverses n-times in immediately consecutive passes a predefined path in the flowing medium over a predefined path length and at a predefined angle relative to the direction of flow, where m and n are mutually different integers, and determining the dead time of the ultrasonic flow-measuring process on the basis of the measured runtimes.

2. The ultrasonic flow-measuring method as in claim 1 including the step of measuring the respective runtime of the ultrasonic signal as it makes m, n, . . . z immediately consecutive passes through the predefined path of the predefined length at the predefined angle relative to the flow direction, with m, n, . . . z being mutually different integers.

3. The ultrasonic flow-measuring method as in claim 2, wherein the dead time $t_d$ of the ultrasonic flow-measuring process is determined by a method of approximation such as the least squares method using the formula $$\begin{bmatrix} 1m \\ 1n \\ \vdots \\ 1z \end{bmatrix} \cdot \begin{bmatrix} t_d \\ t_s \end{bmatrix} = \begin{bmatrix} t_m \\ t_n \\ \vdots \\ t_z \end{bmatrix}$$

where $t_s$ is the runtime only of the passage through the path lengths in the flowing medium.

4. The ultrasonic flow-measuring method as in claim 1 or 2, wherein at least three ultrasonic transducers that are mutually offset in the direction of low, whereby the ultrasonic signal is transmitted from a first ultrasonic transducer along the predefined path over a predefined path length at a predefined angle relative to the direction of low and received by a second ultrasonic transducer, said ultrasonic signal is partly reflected off the line near the second ultrasonic transducer and travels along the predefined path over a predefined path length at a predefined angle relative to the direction of flow toward the third ultrasonic transducer, the runtime of the ultrasonic signal from the first ultrasonic transducer to the second ultrasonic transducer and the runtime of the ultrasonic signal from the first ultrasonic transducer to the third ultrasonic transducer are measured and the dead time of the ultrasonic flow-measuring process is calculated on the basis of the difference between twice the runtime of the ultrasonic signal from the first ultrasonic transducer to the second ultrasonic transducer and the single runtime of the ultrasonic signal from the first ultrasonic transducer to the third ultrasonic transducer.

5. The ultrasonic flow-measuring method as in claim 1 or 2, wherein said dead time is measured in real time and is applied, preferably in real time, in the determination of the flow rate of the flowing medium.

6. An ultrasonic flow-measuring method, whereby the flow rate of a flowing medium through a line is determined by measuring the runtime of an ultrasonic signal that travels from a first ultrasonic transducer to at least one other ultrasonic transducer, comprising the steps of measuring the runtime of the ultrasonic signal as it traverses m-times in immediately consecutive passes a predefined path in the flowing medium over a predefined path length and at a predefined angle relative to the direction of flow;

measuring the runtime of the ultrasonic signal as it traverses n-times in immediately consecutive passes a predefined path in the flowing medium over a predefined path length and at a predefined angle relative to the direction of flow, where m and n are mutually different integers, and calculating the dead time $t_d$ of the ultrasonic flow-measuring process on the basis of the measured runtimes using the formula $$t_d = \frac{t_m \cdot n - t_n \cdot m}{n - m}$$

where $t_m$ is the runtime of the ultrasonic signal in an immediate succession of m passes through the predefined path of the predefined length at the predefined angle relative to the flow direction and $t_n$ is the runtime of the ultrasonic signal in an immediate succession of n passes through the predefined path of the predefined length at the predefined angle relative to the flow direction.

7. The ultrasonic flow-measuring method as in claim 6, including the step of measuring the respective runtime of the ultrasonic signal as it makes m, n . . . z immediately consecutive passes through the predefined path of the predefined length at the predefined angle relative to the flow direction, with m, n, . . . z being mutually different integers.

8. The ultrasonic flow-measuring method as in claim 7, wherein the dead time $t_d$ of the ultrasonic flow-measuring process is determined by a method of approximation such as the least squares method using the formula $$\begin{bmatrix} 1m \\ 1n \\ \vdots \\ 1z \end{bmatrix} \cdot \begin{bmatrix} t_d \\ t_s \end{bmatrix} = \begin{bmatrix} t_m \\ t_n \\ \vdots \\ t_z \end{bmatrix}$$

where $t_s$ is the runtime only of the passage through the path lengths in the flowing medium.

9. The ultrasonic flow-measuring method as in claim 6 or 7, wherein at least three ultrasonic transducers that are mutually offset in the direction of flow, whereby the ultrasonic signal is transmitted from a first ultrasonic transducer along the predefined path over a predefined path length at a predefined angle relative to the direction of flow and received by a second ultrasonic transducer, said ultrasonic signal is partly reflected off the line near the second ultrasonic transducer and travels along the predefined path over a predefined path length at a predefined angle relative to the direction of flow toward the third ultrasonic transducer, the runtime of the ultrasonic signal from the first ultrasonic transducer to the second ultrasonic transducer and the runtime of the ultrasonic signal from the first ultrasonic transducer to the third ultrasonic transducer are measured and the dead time of the ultrasonic flow-measuring process is calculated on the basis of the difference between twice the runtime of the ultrasonic signal from the first ultrasonic transducer to the second ultrasonic transducer and the single runtime of the ultrasonic signal from the first ultrasonic transducer to the third ultrasonic transducer.

10. The ultrasonic flow-measuring method as in claim 6 or 7, wherein said dead time is measured in real time and is applied, preferably in real time, in the determination of the flow rate of the flowing medium.

* * * * *